Figure 1:
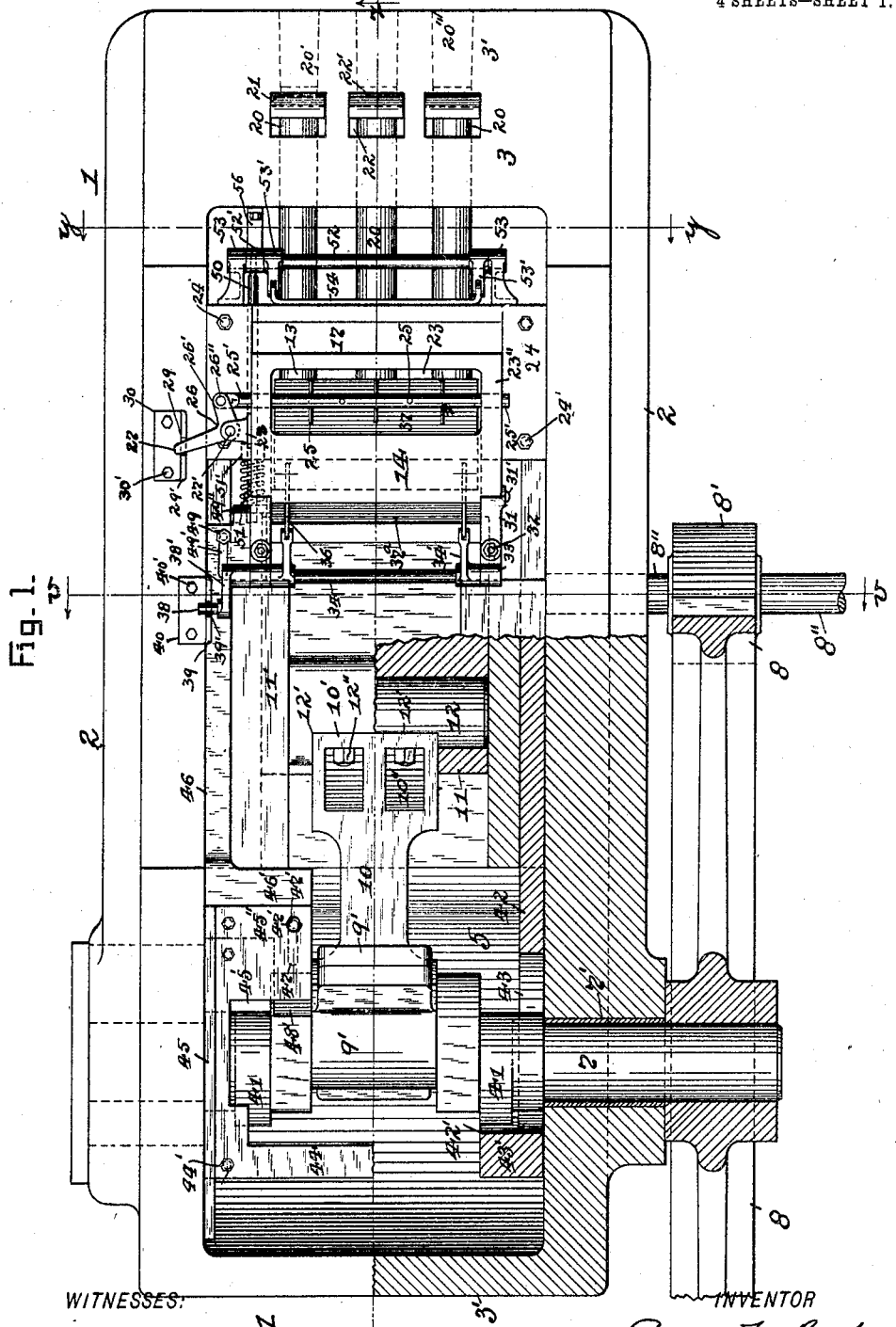

No. 792,729. PATENTED JUNE 20, 1905.
G. W. RIGBY.
BRIQUETING OR MOLDING MACHINE.
APPLICATION FILED APR. 4, 1904.

4 SHEETS—SHEET 1.

WITNESSES:
James L. Wehn.
Robert H. Arthur.

INVENTOR
Grant W. Rigby.
BY
J. N. Cooke
ATTORNEY

No. 792,729. PATENTED JUNE 20, 1905.
G. W. RIGBY.
BRIQUETING OR MOLDING MACHINE.
APPLICATION FILED APR. 4, 1904.

4 SHEETS—SHEET 2.

Fig. 2

WITNESSES:
James L. Wehn
Robert H. [illegible]

INVENTOR
Grant W. Rigby
BY
J. N. Cooke
ATTORNEY

No. 792,729. PATENTED JUNE 20, 1905.
G. W. RIGBY.
BRIQUETING OR MOLDING MACHINE.
APPLICATION FILED APR. 4, 1904.
4 SHEETS—SHEET 3.
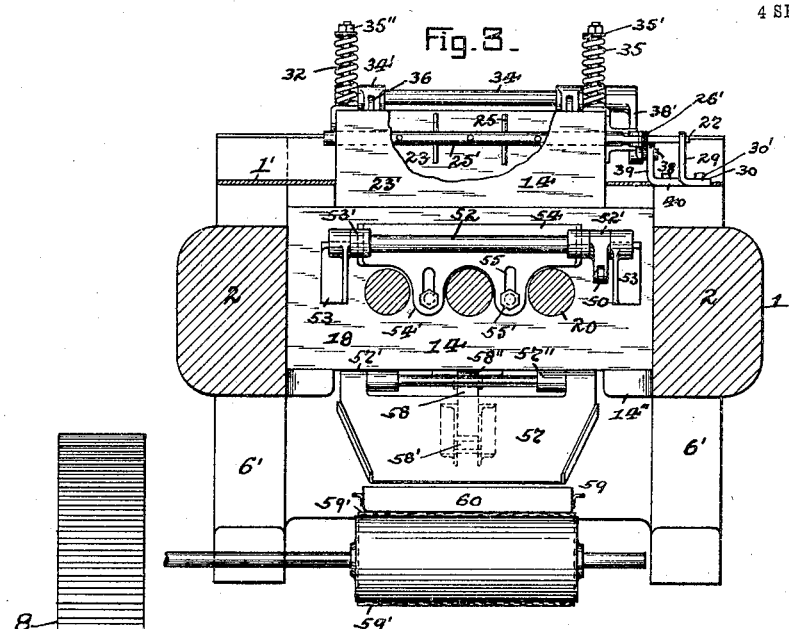
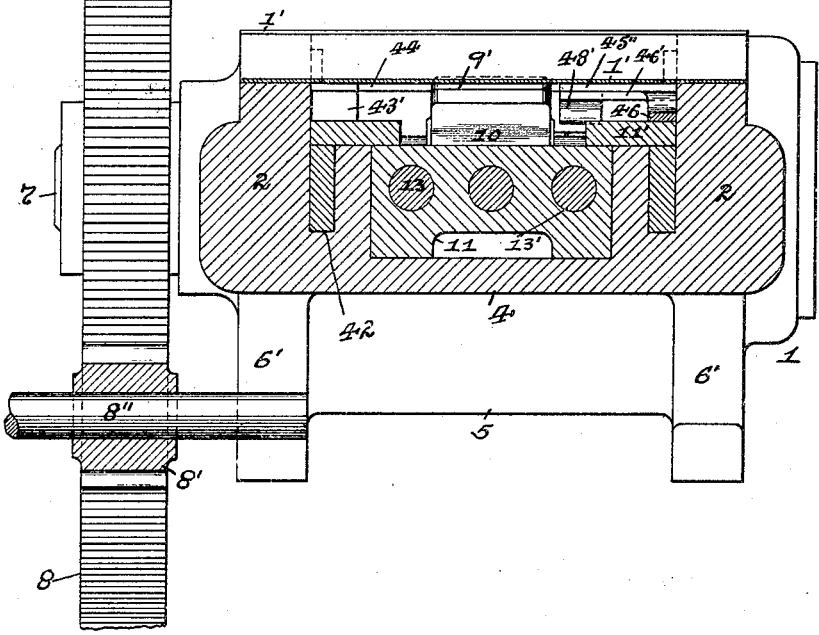
WITNESSES:
James L. Wehn
Robert H. Authelin
INVENTOR
Grant W. Rigby
BY
J. N. Cooke
ATTORNEY No. 792,729. PATENTED JUNE 20, 1905.
G. W. RIGBY.
BRIQUETING OR MOLDING MACHINE.
APPLICATION FILED APR. 4, 1904.
4 SHEETS—SHEET 4.
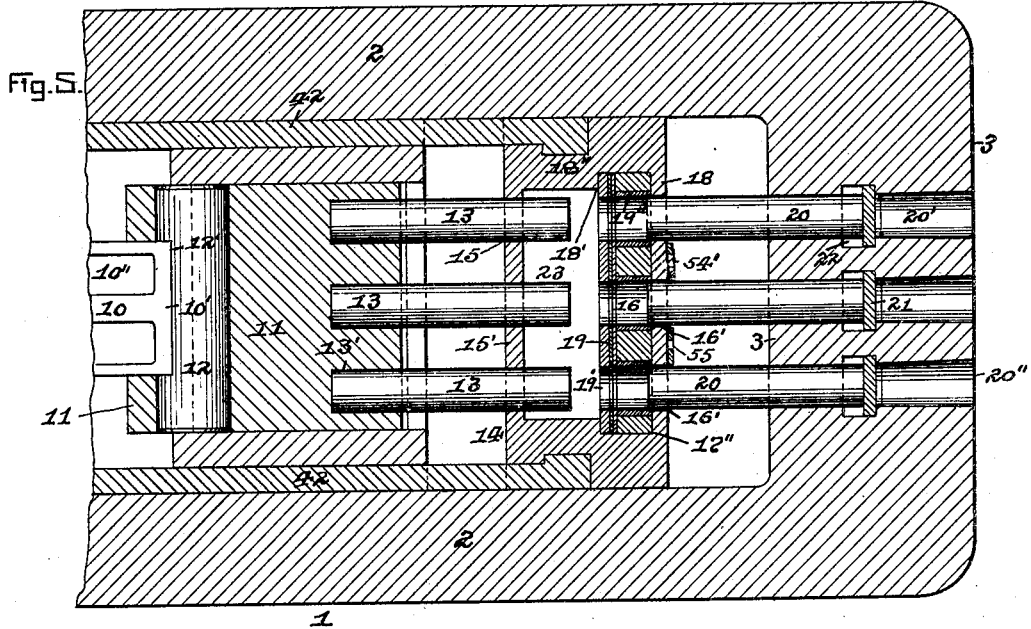
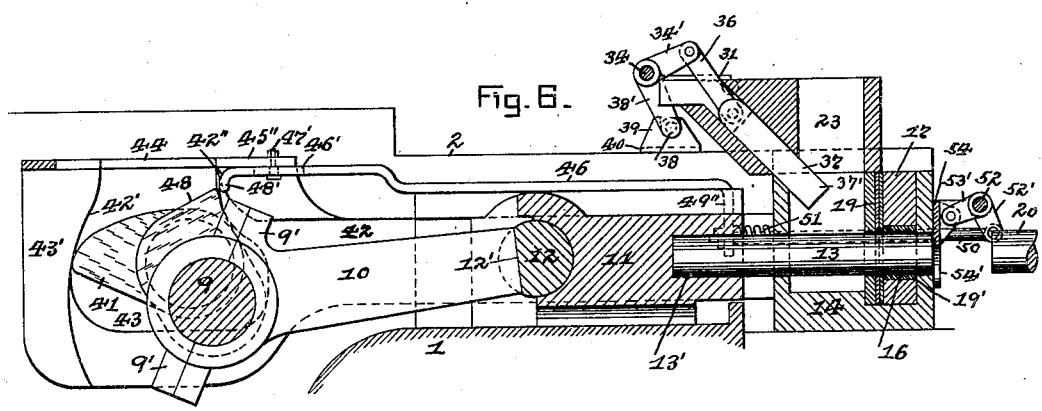
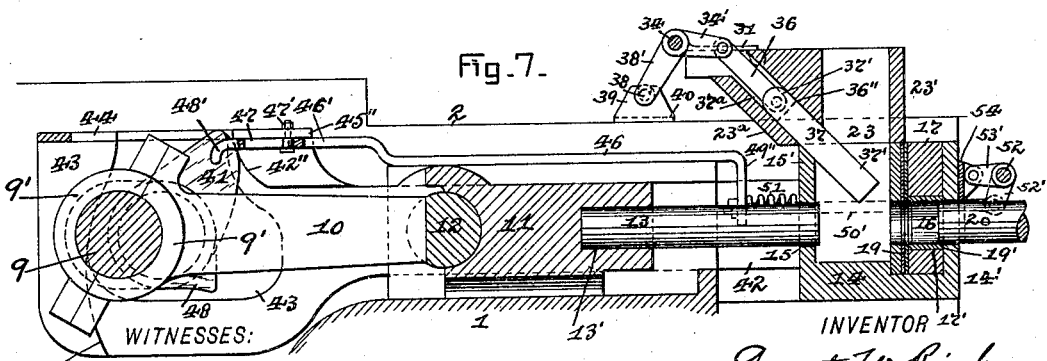

No. 792,729. Patented June 20, 1905.

UNITED STATES PATENT OFFICE.

GRANT W. RIGBY, OF PITTSBURG, PENNSYLVANIA.

BRIQUETING OR MOLDING MACHINE.

SPECIFICATION forming part of Letters Patent No. 792,729, dated June 20, 1905.

Application filed April 4, 1904. Serial No. 201,440.

*To all whom it may concern:*

Be it known that I, GRANT W. RIGBY, a resident of Pittsburg, in the county of Allegheny and State of Pennsylvania, have invented a new and useful Improvement in Briqueting or Molding Machines; and I do hereby declare the following to be a full, clear, and exact description thereof.

My invention relates to molding-machines, and has special reference to what are known as "briqueting-machines" for giving solid form or making briquets from granular or pulverulent fuel preparatory to burning the same or from finely-divided or pulverized ores or minerals preparatory to smelting the same or for other semiplastic materials and similar uses.

The object of my invention is to provide a cheap, simple, and effective molding-machine for these purposes which will contain few parts, will be positive in its action, will not be liable to get out of order easily, and one in which the parts can be easily and quickly taken out for repairing, change, or renewal, as well as one providing for proper adjustment of the parts, great strength, and one with all the working parts contained within the frame of the machine.

To enable others skilled in the art to which my invention appertains to construct and use my improved molding-machine, I will describe the same more fully, referring to the accompanying drawings, in which—

Figure 1 is a top plan view of my improved molding-machine with some of the parts shown in section. Fig. 2 is a longitudinal central section of the machine on the line *x x*. Fig. 3 is a cross-section of the machine on the line *y y*, Fig. 1, looking in the direction of the arrows. Fig. 4 is a cross-section on the line *v v*, Fig. 1, looking in the direction of the arrow. Fig. 5 is a longitudinal section on the line *z z*, Fig. 2, looking in the direction of the arrows. Fig. 6 is a longitudinal central section of the machine, showing the parts in a different position from that shown in Fig. 2. Fig. 7 is a like view showing the parts in another position.

Like symbols of reference herein indicate like parts in each of the figures of the drawings.

As illustrated in said drawings, 1 designates the main frame, which is formed of one casting and is composed of the side frame 2, which are connected by the front and rear end portions 3 3' and by the bottom plate 4. The rear end of the bottom plate 4 of the frame 1 is connected to the rear end portion 3' by the depressed or recessed portion and depending down from the frame 1 and the front and rear legs or standards 6 6' for supporting the machine upon its bed or foundation.

Extending through the side frames 2 at the rear end of the machine is the crank-shaft 7, which has its bearings in said frames 2 by bushings 7' and has a gear-wheel 8 mounted thereon outside of the frame 1 for meshing with a pinion 8', mounted on a counter-shaft 8'' and through which power is transmitted to the machine. A crank-pin 9 is formed on the crank-shaft 7, and connected to this crank-pin 9 by straps 9' is the pitman 10 for connecting with a cross-head 11 by means of a pivot-pin 12, journaled within said cross-head. The head 10' on said pitman 10 fits within a seat 12', formed in said cross-head 11 and pivot-pin 12, so that said pitman is detachably connected to said cross-head by means of screw-bolts 12'', which are located in recesses 10'' of said head 10' and are adapted to pass through said head and into said pin 12.

The cross-head 11 is adapted to slide on the bottom plate 4 and under the guides 11', extending out from the side frames 2, while removably fitting within a seat 13' in the cross-head 11 are the compressing-plungers 13, and each of which are held in place within its seat 13' by a set-screw 13''. Mounted upon the guides 14'', formed on and extending out from said side frames 2, is the feed-box 14, which has openings 15 in the rear wall 15' of the lower portion 14' thereof, through which the plungers 13 are adapted to travel to and from the mold-recesses 16, formed in a mold-plate 17. This mold-plate 17 has the openings 17' through the same and fits within seats 17'', formed between the front wall 18 and the flanges 8', formed on the end walls 18'' of the feed-box 14, while between the mold-plate 17 and said flanges 18' are placed the pressure-plates 19, having the openings 19' therein, and within the openings 17' of the plates 17 for the mold-recesses 16 are the bushings 19", which are held in place by said front wall 18 and pressure-plates 19.

The front end portion 3 is provided with the openings 20', which are flared at their outer ends, as at 20", and are adapted to hold the backing-plungers 20. These plungers 20 are set on a line with the plungers 13, and the rear ends of the same are adapted to enter openings 16', formed in the front wall 18 of the lower portion 14' on the feed-box 14 and in line with the mold-recesses 16. The plungers 20 are held in place by means of set-screws 21' and by shearing-plates 21, which plates 21 pass down through vertical slots 22 in said end portion 3 and are supported by the lugs 22' thereon engaging with the top face 3' of said end portion 3, so that the front ends of said plungers 20 will be backed against said shearing-plates 21.

The feed-box 14 is provided with the upper portion 23', which fits over the lower portion 14' thereof to form the chamber 23 within said feed-box 14 and is removably secured to said lower portion 14' by means of the bolts 24' passing through the flanges 24, formed on the end walls 23" of the upper portion 23', and into the end walls 18" on the lower portion 14'. A rod 25' extends across the chamber 23 and through the end walls 23" of said feed-box 14 and is provided with a series of agitator-bars 25 extending out therefrom, while one end of said rod 25' has a bell-crank lever 26 pivoted by its one end 26' thereto, as at 26", and is fulcrumed at 27' to a plate or bracket 28, secured to the one end wall 23", so that the opposite end 27 of said lever 26 passes through a slot 29, formed in the vertical portion 29' of the plate 30, removably secured to one side frame 2 by means of the bolts 30'.

Pivoted or hinged at 31' to the end walls 23" of the feed-box 14 are the bearing-plates 31, which are adapted to pass around the vertical bars 32 through openings formed in said plates 31, and such plates are provided with the bearing 32 thereon for the rock-shaft 34. The vertical bars 32 are pivoted at 32' within the said end walls 23", and around each of these bars 32 is interposed a spiral spring 35, which is confined between each of said bearing-plates 31 and between a loose collar 35' around said bars 32. These springs 35 are held in place and the tension on the same is regulated by means of a nut 35" engaging with the ends of said bars 32 and fitting against said loose collars 35'. Extending out from the rock-shaft 34 are the arms 34', to the ends of which are pivoted at one end 34" the levers 36, which levers are in turn pivoted at their opposite ends 36' within slots 36", formed in the upper end 37' of the feed-plate 37. The plate 37 is adapted to pass through an inclined passageway 37ª, formed in the rear walls 23ª and 15' of the upper and lower portions 23' 14', respectively, of the feed-box 14, so that the lower end 37" can be across and within the chamber 23 of the feed-box 14 above the plungers 13. One end of the rock-shaft 34 is provided with an arm 38', extending out therefrom, on the end of which is secured a pin 38 for fitting within a slot 39', formed in the vertical portion 39 of a plate 40, which is removably screwed to one of the side frames 2 by means of the bolts 40'.

The crank-shaft 7 is provided with the cams 41 thereon, which are adapted to engage with cam-faces 42' 42", carried by the connecting-arms 42, and these arms 42 have the openings 43 therein for the passing of the crank-shaft 7 through the same, while such cam-faces 42' 42" are formed on each side of the openings 43 in said arms 42 and extend out from one side of said arms. These arms 42 are adapted to move adjacent to the side frames 2 and are connected to the side walls 18" on the lower portion 14' of the feed-box 14. A sliding frame 44 extends across and between the arms 42 and is secured over the openings 43 therein and to said arms and the rear portions 43' thereof by means of the bolts 44'. The frame 44 slides under guides 45 on the side frames 2, and slots 45' are formed in said frame for the movement of the cams 41, while projecting out from the front end of said frame, at one side thereof, is an extension 45", which is adapted to be connected to a rod 46 for operating the knock-off device by means of an L-shaped portion 46 extending out from the said rod and under the extension 45" on the sliding frame 44. A slot 47 is formed in said portion 46', and a pin or bolt 47' on said extension 45" is adapted to pass through said slot 47 to support and carry one end of said rod 46, as well as permitting said rod to be moved by means of a cam 48 on the crank-shaft 7, engaging with a downwardly-extending lug 48' on the rear end of the portion 46' on the rod 46. The opposite end of rod 46 is connected to one of the arms 42 by a pin 49 on said arm passing through a slot 49' in said rod 46, and the front end of said rod is provided with a downwardly-projecting portion 49" for supporting one end of a bar 50, which passes through an opening 50' in the end wall 18" in the lower portion 14' of the feed-box 14 and at one side of the chamber 23 therein. A spiral spring 51 is interposed around said bar 50 and between the projecting portion 49" on the rod 46 and rear wall 15' of the feed-box 14'. The other end of said bar 50 is connected to an arm 52' on the rock-shaft 52, and this shaft 52 is supported in bracket 53, extending out from and secured to front wall 18 on the lower portion 14' of the feed-box. Connected to arms 53' on the rock-shaft 52 is a knocker-plate 54, which extends down alongside of the front wall 18 and is provided with projections 54' thereon for extending down between the openings 16' in said front wall 18', while vertical slots 55 are formed in said plate 54 and projections 54' for the reception of pins or bolts 55' on the wall.

A bracket 56' is screwed to the front end portion 3 of the main frame 1 and is provided with an end portion 56 thereon for engaging with the arm 52' on the rock-shaft 52 to rock said shaft and raise the knocker-plate 54.

Hinged at 57" to the bottom wall 57' of the lower portion 14' on the feed-box 14 is an apron 57, which has a rod 58 pivoted thereto at 58' and to the bottom plate 4 of the main frame 1 at 58", while below said apron 57 is a suitable endless conveyer-belt 59', on which is located a pan-conveyer 59, composed of a series of pans 60, which are made, preferably, of sheet metal and have one end 60" formed on a straight vertical line and the opposite end being bent in the form of a hook, as at 60', for fitting over and catching the ends 60" when the pans 60 are placed together on the belt 59, so that the empty pans will be drawn along by the full pans from the guide-bars or table 61 onto the belt 59' to be filled.

The use and operation of my improved molding-machine is as follows: The material to be made into the form of blocks or briquets is fed into the chamber 23 of the feed-box 14 by means of a conveyer (not shown) or in any other suitable manner, and power being applied to the shaft 8" will act to revolve the crank-shaft 7 through the medium of the pinion 8 on said shaft 8" meshing with the gear-wheel 8 on the crank-shaft 7. As this crank-shaft 7 is thus revolved the cams 41 thereon are also revolved therewith and will engage the cam-faces 42" on the arms 42, which arms being connected to the feed-box 14 will be moved forward by said cams 41, and with them the feed-box 14, so that such feed-box reaches the position shown in Figs. 2 and 7 with the rear ends of the backing-plungers 20 within the openings 16', formed in the front wall 18 of said feed-box 14, and entering the mold-recesses 16, formed in the mold-plate 17. As these arms 42 and feed-box are thus moved forward the sliding frame 44 between the arms 42 and carried by said arms, as well as the rod 46 carried by said frame 44 and one of said arms 42, are also moved forward, and upon the further revolution of the crank-shaft 7 the pitman 10, connected to the crank-pin 9 on said shaft 7, is moved forward, and with it the cross-head 11, by reason of said pitman being also connected to said cross-head 11 by the pin 12. The cross-head 11 in moving forward slides on the bottom plate 4 and under the guides 11', and by reason of the compressing-plungers 13 being carried by and connected to said cross-head the said plungers 13 are made to travel from the openings 15 in the rear wall 15' of the feed-box 14, as shown in Fig. 7, through the chamber 23 of said feed-box and through the openings 19' in the pressure-plates 19, so as to enter the mold-recesses 16 and compress the material carried by the front ends of said plungers 13 within said recesses 16 and between the ends of said plungers 13 and 20, as shown in Fig. 2. After the material has been thus compressed within the mold-recesses 16 and upon the further revolution of the crank-shaft 7 the cams 41 on the shaft 7 will engage with the cam-faces 42' on the arms 42 as said cams 41 are revolved with the shaft 7, so that said arms 42, connected to and carrying the feed-box 14, are drawn back to the position shown in Fig. 6, as well as the sliding frames 44 and rod 46, carried on said arms and frame, so that upon the further revolution of the shaft 7 the cam 48 on said shaft will engage with the lug 48' as said cam is revolved with said shaft, and in passing said lug the cam will push the rod 46 forward by reason of the slots 47 and 49' in said rod engaging with the bolt and pin 47' and 49 on said frame 44 and one of said arms 42, respectively. As this rod 46 is thus pushed forward the bar 50, passing through the opening 50' in the feed-box 14 and connected to the downwardly-projecting portion 49" on said arm and to the arm 52' on the rock-shaft 52, will act to push forward said arm 52', and so rock or turn the shaft 52, which will push down the knocker-plate 54, extending down along the front wall 18 of the feed-box 14, through the medium of the arms 53' on said shaft being connected to said knocker-plate. This will allow said plate to be held in place and travel by its slots 55 fitting around the bolts 55', so that the portions of said knocker-plate 54 between the projections 54' thereon will engage with the blocks or briquets exposed by the drawing back of said feed-box and held on the end of the plungers 13 and knock said blocks or briquets off in case they should happen to stick to the end of said plungers. Upon the further revolving of the crank-shaft 7 the cross-head 11 will be drawn back in its guides 11' and on the bottom plate 4 through the medium of the pitman 10, connected to said crank-shaft by the pin 9 and to the cross-head by the pin 12, thereby withdrawing the plungers 13, with said cross-head 11, through the openings 16 in the front wall 18 of the feed-box 14 and through the mold-recesses 16 from the position shown in Fig. 6 to the position shown in Fig. 7, when the machine is ready to move forward the feed-box 14 again and repeat the operations in forming the blocks or briquets.

By reason of the shape and form of the cams 41 and cam-faces 42' and 42" on the arms 42, connecting the feed-box 14, the said feed-box 14 is adapted to be moved more rapidly in its forward and backward movements than that of the compressing-plungers 13, and during these movements of the said feed-box the material fed to the chamber 23 of said feed-box is held and dropped into the lower part of said chamber 23 and in the path of the plungers 13 by the feed-plate 37, which is lowered and raised during the forward and backward movements, respectively, of said feed-box 14. This is accomplished by the pin 38 on the arm 38' of the rock-shaft 34, fitting within the slot 39' in the vertical portion 39 of the plate 40, secured on the side frame 2, which will turn or rock said shaft 34 in both the forward and backward movements of the feed-box, and thereby lower and raise the feed-plate 37, which is connected to said rock-shaft 34 by the levers 36 engaging with the arms 34' on said shaft 34. In case of any obstruction by the material or from other sources to said feed-plate 37 on its operative parts the rock-shaft 34 can be raised by reason of the said rock-shaft being journaled in the bearings 33 on the plates 31, which are pivoted to the end walls 23" of the feed-box 14, thereby allowing the ends of said plates containing said bearings to rise, and with them the shaft 34, and so compressing the springs 35 around the bars 32 between said plates 31 and the loose collars 35' on said bars 32. During the raising of said shaft 34 the pins 38 on the arms 38' of said shaft will travel up within the slot 39' in the vertical portion 39 of the plate 40 on the side frame 2, and after the obstruction to the feed-plate 37 has been removed the shaft 34 and plates 31 will be returned to their normal position by the tension on the springs 35 being released, and the pin 38 will be dropped down to its normal position within the said slot 39'.

During the forward and backward movements of the feed-box 14 the material within the chamber 23 of said feed-box will be agitated above the feed-plate 37 and the agitator-bars 25 on the rod 25', and such rod and bars are moved within and lengthwise of said chamber 23 to agitate said material by means of the end 27 of the crank-lever 26, pivoted to said rod and to the bracket 28, fitting within the slot 29, with the vertical portion 29' of the plate 30 on the said frame 2. During the forward movement of the feed-box 14 the apron 57 is lowered or dropped to the position shown in Figs. 2 and 3 by reason of the frame being hinged to the bottom 57' of said feed-box at 57" and being connected to the stationary bottom plate 4 at 58' by the rod 58, so that as the blocks or briquets are formed in the mold-recesses 16 and dropped from the end of the plungers 13 or knocked from said ends by the knocker-plate 54 they will slide down said apron 57 into one of the pans 60 on the belt 59, so they can be carried by said pans from under the machine, where they can be lifted off and set on bars ready to go into the drier or furnace. Upon the backward movement of the feed-box 14 the apron 57 will be raised on account of the rod 58 on the apron 57 being pivoted thereto and to the stationary bottom plate, so as to be ready for lowering or dropping upon the forward movement of said feed-box and allow the next set of blocks or briquets formed in the mold-recesses 16 to slide down said apron into the next one of the pans 60, as before described.

It will be observed that the pressure-plates within the feed-box can be of different thicknesses in order to vary the pressure as desired in forming the blocks or briquets within the mold-recesses—as, for instance, by the insertion of thicker plates the pressure on the blocks or briquets is increased—and these plates can be easily and quickly inserted within the feed-box at any time by simply lifting out the mold-plate carrying the mold-recesses and placing the number or thickness of plates desired within the feed-box.

As the frame is all made in one casting, the guides for the feed-box and the bottom plate as the guide for the cross-head are formed thereby, so that the machine is reduced in simplicity from the ordinary class of this machinery, and the working parts are covered by the cover-plates 1', extending across and over the main frame 1, in order to protect these parts from the dust, dirt, &c., usually made around such machinery, while the oil for lubricating the parts will be contained within the depressed rear portion of said main frame, so as to be carried up and into the working parts as the parts on the crank-shaft are revolved through the same.

The front end of the main frame is boxed the same as the feed-box, and as this end holds the backing plungers by the shearing-plates it will be evident that these plungers, as well as the compressing-plungers, can be easily and quickly removed for changing or adjusting when desired or for any purpose by simply lifting out the shearing-plates and loosening the set-screws for these plungers, when the backing plungers can be pushed out through the flared openings in the front end of the main frame and the compressing-plungers pushed out from the cross-head through the feed-box and mold-recesses and out through said flared openings.

Any number of mold-recesses can be made in the feed-box and the plungers so increased, while, if desired, the mold-recesses and plungers can be placed one over the other by simply increasing the width or height of the feed-box in either case, and in case it is desired to change the liners in the mold-recesses for any purpose all that is necessary is to remove the mold-plate and knock out the old liners.

It will thus be seen that all the parts of the machine are easy of access and are not liable to get out of order, while at the same time all parts can be kept as well lubricated as desired, so as to allow of their free and easy working at all times.

Various modifications and changes in the construction, design, and operation of the machine may be resorted to without departing from the spirit of the invention or sacrificing any of its advantages.

What I claim as my invention, and desire to secure by Letters Patent, is—

1. In a molding-machine, the combination with a machine-frame, a reciprocating feed-box provided with mold-recesses therein, reciprocating plungers adapted to enter said mold-recesses, a rod within said feed-box, agitator-bars on said rod, a bracket on said frame having a slot therein, and a crank-lever connected to said rod and engaging with said slot for moving said rod to agitate the material within said feed-box during the movement of the latter.

2. In a molding-machine, the combination with a machine-frame, a reciprocating feed-box provided with mold-recesses therein, reciprocating plungers adapted to enter said mold-recesses, a feed-plate movable within said feed-box for feeding the material in front of the plungers for the mold-recesses, a rock-shaft journaled on said feed-box and provided with arms thereon, links connecting said arms and feed-plate, a bracket on said frame having a slot therein, an arm on the end of said rock-shaft, and a pin on said arm and engaging with said slot for rocking said shaft to reciprocate said feed-plate.

3. In a molding-machine, the combination with a machine-frame, a reciprocating feed-box provided with mold-recesses therein, reciprocating plungers adapted to enter said mold-recesses, a feed-plate for feeding the material in front of the plungers for the mold-recesses, a rock-shaft journaled on said feed-box and connected to said feed-plate, means for rocking said shaft to reciprocate said feed-plate, and means for permitting the raising of said rock-shaft.

4. In a molding-machine, the combination with a machine-frame, a reciprocating feed-box provided with mold-recesses therein, reciprocating plungers adapted to enter said mold-recesses, a feed-plate movable within said feed-box for feeding the material in front of the plungers for the mold-recesses, bearings pivoted to said feed-box, a rock-shaft journaled in said bearings and connected to said feed-plate, means for rocking said shaft to reciprocate said feed-plate, and means for permitting the raising and lowering of said bearings and rock-shaft.

5. In a molding-machine, the combination with a machine-frame, a reciprocating feed-box provided with mold-recesses therein, reciprocating plungers adapted to enter said mold-recesses, a feed-plate movable within said feed-box for feeding the material in front of the plungers for the mold-recesses, bearings having plates thereon for pivoting to said feed-box, a cross-shaft journaled in said bearings and connected to said feed-plate, means for rocking said feed-plate, vertical rods extending loosely through said bearing-plates and pivoted to said feed-box, and springs on said rods between said bearing-plates and collars on said rods for permitting the raising and lowering of said bearings and rock-shaft.

6. In a molding-machine, the combination with a machine-frame, a reciprocating feed-box provided with mold-recesses therein, reciprocating plungers adapted to enter said mold-recesses, and a mold-plate extending across and fitting within said feed-box and having said mold-recesses formed therein.

7. In a molding-machine, the combination with a machine-frame, a reciprocating feed-box provided with mold-recesses therein, reciprocating plungers adapted to enter said mold-recesses, and a removable mold-plate extending across and fitting within said feed-box and having said mold-recesses formed therein.

8. In a molding-machine, the combination with a machine-frame, a reciprocating feed-box provided with mold-recesses therein, reciprocating plungers adapted to enter said mold-recesses, a removable mold-plate fitting within said feed-box and having said mold-recesses formed therein, and linings fitted within said mold-recesses and held from displacement by the front wall of said feed-box.

9. In a molding-machine, the combination with a machine-frame, a reciprocating feed-box provided with mold-recesses therein, reciprocating plungers adapted to enter said mold-recesses, a removable mold-plate fitting within said feed-box and having said mold-recesses formed therein, and removable pressure-plates fitting against said mold-plate and having openings formed therein for the passage of said plungers through the same.

10. In a molding-machine, the combination with a machine-frame, a reciprocating feed-box provided with mold-recesses therein, reciprocating plungers adapted to enter said mold-recesses, a removable mold-plate fitting within said feed-box and having said mold-recesses formed therein, removable pressure-plates fitting against said mold-plates and having openings formed therein for the passage of said plungers through the same, and linings fitting within said mold-recesses and held from displacement by the end wall of said feed-box and said pressure-plates.

11. In a molding-machine, the combination with the machine-frame having vertical slots in the front end thereof, a reciprocating feed-box provided with mold-recesses therein, reciprocating plungers adapted to enter said mold-recesses, stationary backing plungers mounted in and rigidly connected to the front end of said machine-frame for closing the outer ends of said mold-recesses, and removable shearing-plates fitting in said slots for holding said backing plungers in place.

12. In a molding-machine, the combination with the machine-frame having vertical slots in the front end thereof and horizontal openings on each side of said slots, a reciprocating feed-box provided with mold-recesses therein, reciprocating plungers adapted to enter said mold-recesses, stationary backing plungers mounted in the inner horizontal openings, and removable shearing-plates fitting in said slots and over said outer horizontal openings for holding said backing plungers in place, said outer openings being enlarged at their outer ends to permit the withdrawal of said backing plungers.

13. In a molding-machine, the combination with the machine-frame, a reciprocating feed-box provided with mold-recesses therein, reciprocating plungers adapted to enter said mold-recesses, and a tilting apron hinged to said feed-box and connected to the machine-frame for catching and delivering the molded material from the mold-recesses.

14. In a molding-machine, the combination with the machine-frame, a reciprocating feed-box provided with mold-recesses therein, reciprocating plungers adapted to enter said mold-recesses, a tilting apron hinged to said feed-box for catching and delivering the molded material from the mold-recesses, and a rod pivoted to said apron and hinged to the machine-frame for tilting said apron by the movement of the feed-box.

In testimony whereof I, the said GRANT W. RIGBY, have hereunto set my hand.

GRANT W. RIGBY.

Witnesses:
J. N. COOKE,
JAMES L. WEHN.